United States Patent
Lewis et al.

(10) Patent No.: US 9,665,657 B2
(45) Date of Patent: May 30, 2017

(54) DYNAMICALLY PICKING CONTENT FROM SOCIAL SHARES TO DISPLAY IN A USER INTERFACE

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 479 days.

(21) Appl. No.: 14/035,882

(22) Filed: Sep. 24, 2013

(65) Prior Publication Data
US 2015/0089384 A1 Mar. 26, 2015

(51) Int. Cl.
*G06F 3/00* (2006.01)
*G06F 17/30* (2006.01)

(52) U.S. Cl.
CPC .... *G06F 17/3089* (2013.01); *G06F 17/30876* (2013.01)

(58) Field of Classification Search
CPC .......... G06F 15/16; G06F 17/20; G06F 17/38; G06F 17/30876; G06G 17/00
See application file for complete search history.

(56) References Cited

U.S. PATENT DOCUMENTS

| | | | |
|---|---|---|---|
| 8,250,145 B2 | 8/2012 | Zuckerberg et al. | |
| 8,370,325 B2 | 2/2013 | Shibata et al. | |
| 2007/0156672 A1* | 7/2007 | Wolff | G06F 17/3089 |
| 2010/0211535 A1 | 8/2010 | Rosenberger | |
| 2011/0022449 A1* | 1/2011 | Bourne | G06F 9/4443 705/14.4 |
| 2012/0005224 A1 | 1/2012 | Ahrens et al. | |
| 2012/0233256 A1 | 9/2012 | Shaham et al. | |
| 2013/0124627 A1 | 5/2013 | Cathcart et al. | |

OTHER PUBLICATIONS

International Application No. PCT/US2014/057309, Written Opinion & Search Report dated Dec. 24, 2014, 8 pages.

* cited by examiner

*Primary Examiner* — Dino Kujundzic
(74) *Attorney, Agent, or Firm* — Lowenstein Sandler LLP

(57) ABSTRACT

A dynamic selection of content from social shares to display in a user interface is performed. A request for a user interface (UI) document is received. A set of identifiers is associated with the UI document. The set of identifiers includes a page identifier for the UI document. An identifier list for a social share associated with the UI document is obtained in view of the page identifier. The identifier list associated with the social share is updated in view of the set of identifiers associated with the UI document. The UI document is modified to provide a representation associated with an identifier selected from the updated identifier list for the social share.

20 Claims, 8 Drawing Sheets

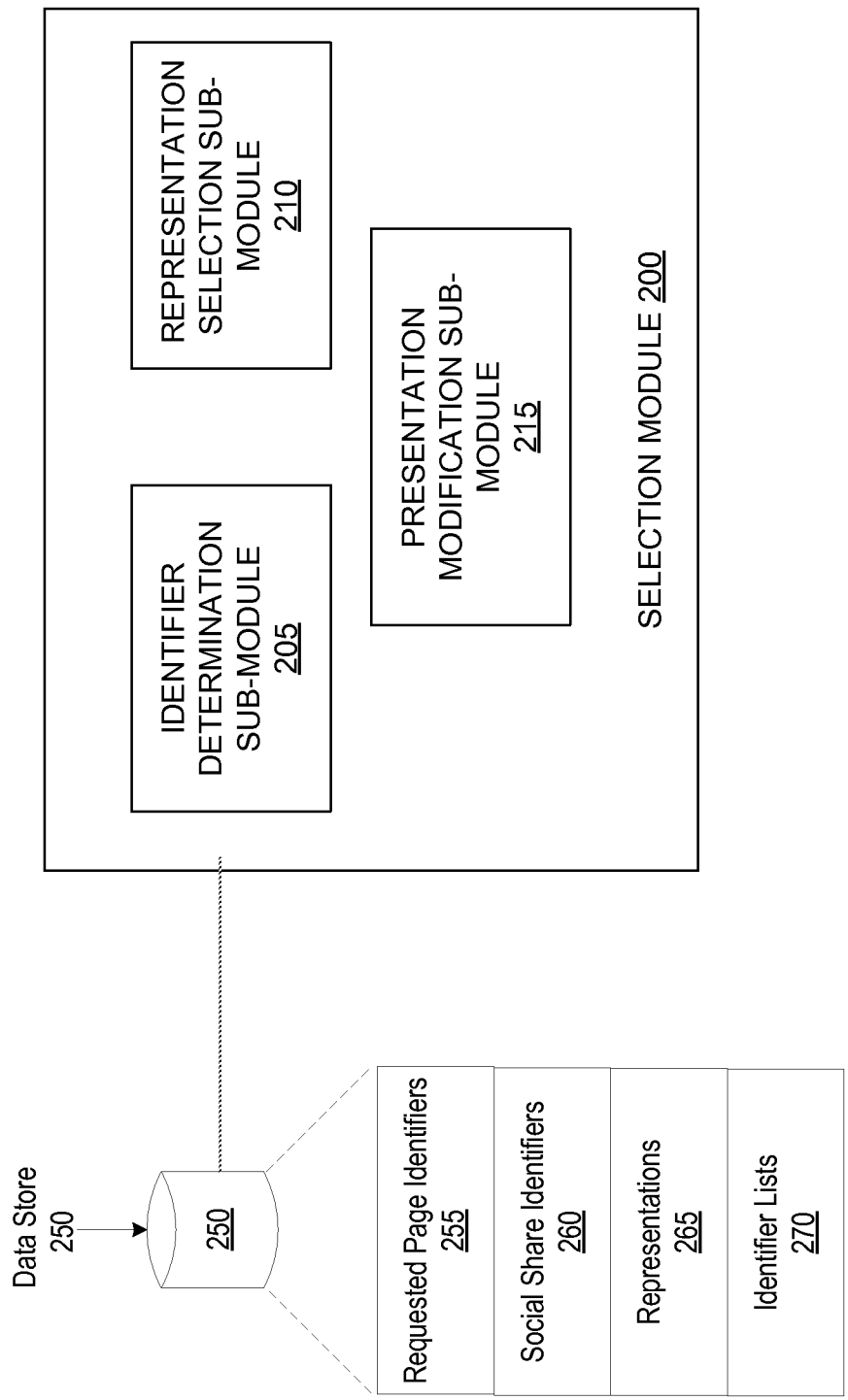

DYNAMICALLY PICKING CONTENT FROM SOCIAL SHARES TO DISPLAY IN A USER INTERFACE

TECHNICAL FIELD

Embodiments of the present disclosure relate to the field of content watching services and, more particularly, to a method for dynamically picking content from social shares to display in a user interface.

BACKGROUND

On the Internet, content hosting services or other applications allow users to upload, view, and share media items or data content. Such media items or data content may include audio clips, movie clips, TV clips, and music videos, as well as content such as blogs, social media pages, short original videos, pictures, photos, articles, avatars, software programs, games, etc. Social networking services allow users to share media items or data content with other users.

Content hosting sites and social networking sites allow users to create social shares, such as comments or posts. The social shares can include references to media items or data content. The social shares can be displayed as comments or posts on the content hosting services or social networking site. However, when the social shares are displayed on the content hosting services or social networking site, metadata associated with the references included in the social shares may not be displayed or may include redundant information.

SUMMARY

In one embodiment, a method for dynamic selection of content from social shares to display in a user interface is performed. A request for a user interface (UI) document is received. A set of identifiers is associated with the UI document. The set of identifiers includes a page identifier for the UI document. An identifier list for a social share associated with the UI document is obtained in view of the page identifier. The identifier list associated with the social share is updated in view of the set of identifiers associated with the UI document. The UI document is modified to provide a representation associated with an identifier selected from the updated identifier list for the social share.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

FIG. 2 illustrates a selection module, in accordance with one embodiment of the present disclosure.

DETAILED DESCRIPTION

Figure 1:
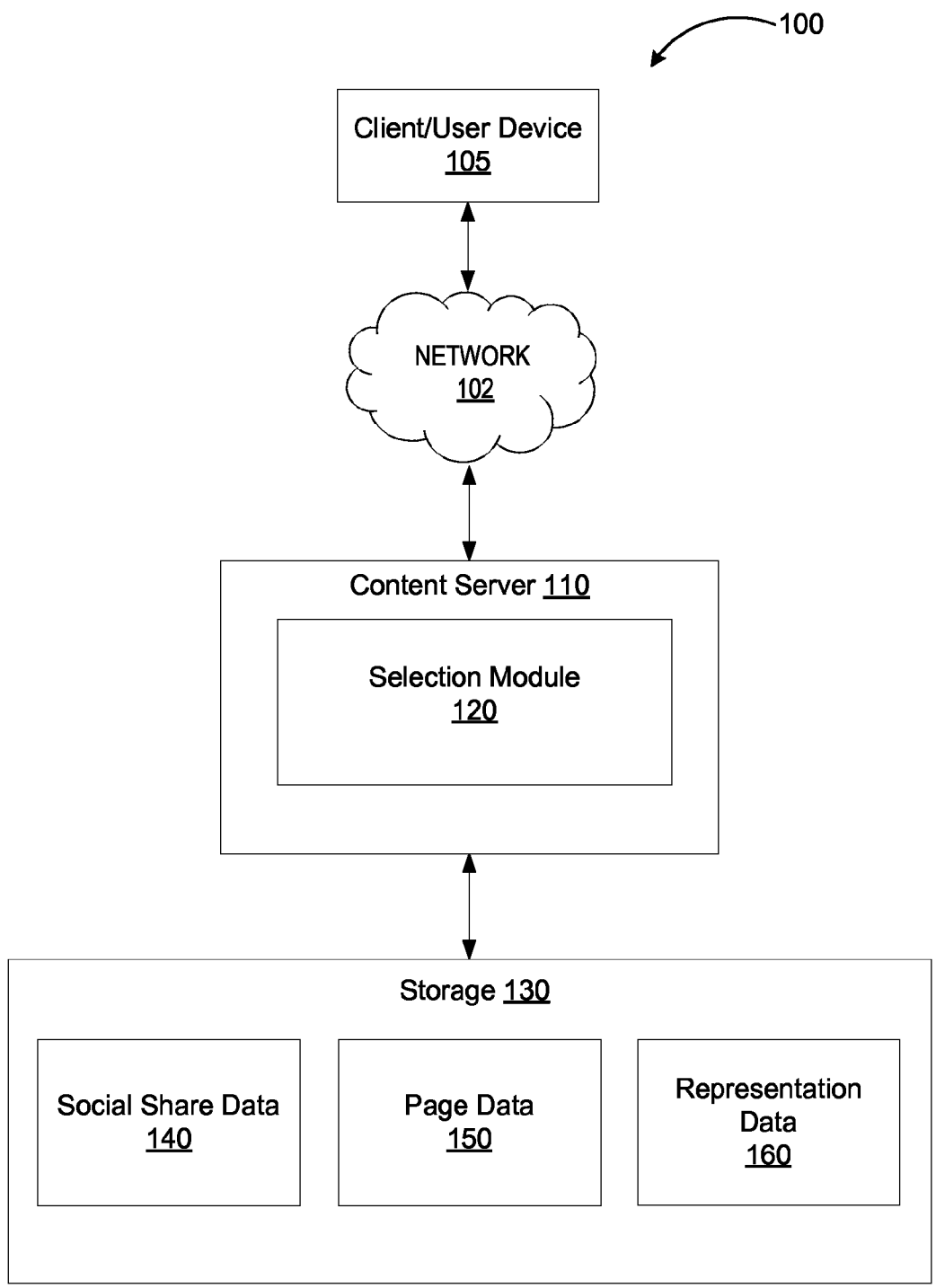
FIG. 1 illustrates an example system architecture, in accordance with one embodiment of the present disclosure.

Social networking services allow users to share media items or data content with other users and further allow users to create social shares, such as comments or posts, to associate with the media items or data content. A social share refers to content (e.g., comments or posts) resulting from a user sharing a media item (e.g., via a like request, a share request, a comment request, a tag request, etc.) on a social network or a content sharing service. For example, a user viewing video A in a graphical user interface (GUI) can post a comment on video A in the GUI. The social shares can include references to media items or data content. For example, a comment on video A can include the title of video A and a link to video B. A social share can be associated with a GUI document (e.g., a web page or a mobile app document) presented when the social share was provided or submitted, as well as GUI documents associated with references made within the social share. For example, a social share referencing video B on video A's page is included on video A's page and video B's page. In another example, a social share referencing person C on video A's page is included on video A's page and person C's social network page. However, when the social shares are displayed, metadata or a representation for the reference in the social share may not be displayed or may include redundant metadata or representations. The metadata or representation can include a visual representation for the media item, such as a thumbnail, or any other representation for the media item. For example, a social share may include a reference to video A and a reference to video B. However, when the social share is included on video A's page, the social share does not include a thumbnail for video B or a reference to video B, or the social share includes a thumbnail for video A and a thumbnail for video B, even though video A is already represented on video A's page.

Embodiments of the disclosure pertain to dynamic selection of content from social shares to display on a GUI. The GUI can be a watch page for a media item, a GUI presenting a playlist, a social network GUI associated with a social networking site, a channel GUI associated with one or more media items of a channel, etc. As described above, conventionally when the social share is associated with a GUI document (e.g., a web page or a mobile app document), any selection of content, such as metadata or a representation for a reference in the social share, is removed or selections of content for all references are included, causing redundant metadata or representations.

Embodiments of the present disclosure dynamically select content from social shares to include on a GUI by selecting a representation for a social share based on the GUI in which the social share is included. In some embodiments, a request for a GUI document (e.g., a web page or a mobile app document) is received responsive, for example, to a user request for content. The GUI document is associated with a set of identifiers and one or more social shares associated with the GUI document are determined based on the set of identifiers associated with the GUI document. The set of identifiers can include the identifier of the GUI document, as well as any other identifiers represented by the GUI document such as media items or playlists to be presented on the GUI. For example, if video A is part of playlist B, the set of identifiers for video A's page will include video A and playlist B. An identifier list for each social share associated with the GUI document is obtained, which includes an identifier for each reference made in the social share. For example, if social share C includes a reference to video A and video D, the identifier list will include video A and video D. The identifier list for the social share is updated in view of the set of identifiers associated with the GUI document to remove the identifiers of content (e.g., media items or playlists) to be presented on the GUI. Using the previous examples, the set of identifiers associated with video A's page are video A and playlist B and the identifier list for social share C includes video A and video D. In this example, the identifier list for social share C will be updated to remove video A from the identifier list because video A is already represented on the video A's page. The GUI document is modified to include a representation associated with an identifier selected from the updated identifier list for the social share. Using the previous example, a representation for video D will be selected and the page for video A will be modified to include the representation for video D.

Accordingly, aspects of the present disclosure allow a user to view a representation for a reference to content in a social share, and the user can be more likely to view or notice the content in the social share because of the representation. In addition, the representation that is selected to be included in the social share can change depending on the page in which the social share is included, and will not include a redundant representation of a reference that is already included on the page.

It should be noted that although some aspects of the present disclosure are described with reference to video and/or pages, the present disclosure pertains to various types media content (e.g., video, audio, text, images, executable instructions, etc.) and/or various types of GUI documents (e.g., web pages, mobile app documents, etc.).

FIG. 1 illustrates an example system architecture 100, in accordance with one embodiment of the present disclosure. System 100 comprises a client/user device 105 in communication with (e.g., coupled to) a content server 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. Embodiments of the disclosure may operate as a standalone system.

In one embodiment, the content server 110 provides a page including media items (e.g., digital video, streaming video, images, digital music, streaming music, etc.) and social shares (e.g., comments, posts, etc.) to one or more of the client/user devices 105. For example, the content server 110 may provide a page requested by a user that includes a representation for relevant content in the social share on the client/user device 105 via the network 102.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include social share data 140, page data 150, and representation data 160. Social share data 140 may include identification information for social shares, such as an identifier (e.g., URL) for the page on which the social share was made, and one or more identifiers (e.g., URL) for references to content associated with the social share (e.g., a media item referenced in the social share, a channel referenced in the social share, a page referenced in the social share, a playlist referenced in the social share, a user referenced in the social share, etc.). Social share data 140 can include the unique identification information for each reference in an identifier list for the social share.

Page data 150 may include identification information for the page, such as an identifier (e.g., URL) for the page, an identifier of a media item associated with the page (e.g., media item identification number), an identifier for a channel (e.g., channel identification number) associated with the media item included in the page when the media item is associated with a channel, an identifier for a playlist (e.g., playlist identification number) associated with the media item included in the page when the media item is associated with a playlist, an identifier for a user (e.g., user identification number) associated with the page, etc. Page data 150 can be part of the metadata for the pages available to the content server 110 and can be generated by the content server 110.

Representation data 160 can include metadata representing content available to the content server 110, such as a visual or graphical representation (e.g., thumbnail) of each media item, channel, playlist, user, etc. associated with the content server 110. Representation data 160 can be part of the metadata for the pages available to the content server 110 and can be generated by the content server 110.

In situations in which the systems discussed here collect personal information about users, or may make use of personal information, the users may be provided with an opportunity to control whether the content server 110 collects user information (e.g., information about a user's social network, social actions or activities, profession, a user's preferences, or a user's current location), or to control whether and/or how to receive content from the content server 110 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content server 110.

During operation of system 100, a user accesses system 100 via client/user device 105 over network 102. The content server 110 receives communications from the client/user device 105, and processes and/or directs these communications accordingly.

As discussed above, conventionally, when a page that includes a social share is presented to a user, the social share typically does not include a representation for references to content included in the social share or includes redundant representations. Embodiments of the present disclosure address this problem by dynamically selecting a representation for the social share to display on the page.

In particular, in one embodiment, when a user requests a page, the content server 110 selects at least one representation to include in the social share on the page. In one embodiment, the content server 110 includes a selection module 120 that selects the representation for the social share associated with the page. In one embodiment, the selection module 120 can select the representation for the social share by identifying data for the social share, determining whether the data for the social share is represented on the page, and including a representation for at least a portion of the data for the social share that is not represented on the page. In some embodiments, the selection module 120 selects a representation for each social share associated with the page. For example, if multiple social shares are associated with a page, the selection module 120 will select a representation for each of the multiple social shares.

The selection module 120 can identify the data for the social share using the social share data 140 stored in the storage system 130. In one embodiment, the selection module 120 obtains the data for the social share by submitting a query including the identifier associated with the requested page to the social share data 140 in the storage system 130. In an alternate embodiment, the selection module 120 obtains the data for the social share by searching the social share data 140 for the unique identifier associated with the page. In another alternate embodiment, processing logic obtains the data for the social share by receiving the data for the social share from a content hosting service, a social network site, a computing system, a content server, etc. (not shown).

In one embodiment, the data for the social share includes an identifier list for each social share associated with the page. In this embodiment, the identifier list includes a unique string identifier for the page on which the social share was made (e.g., a canonical URL) and a unique string identifier (e.g., canonical URL) for each reference or page identified in the social share (e.g., a URL included in the social share). A canonical string identifier (such as a canonical URL) for the page is a base identifier or a minimum identifier that can be used to access the page. In an alternate embodiment, the data for the social share includes an identifier for the page on which the social share was made and an identifier for each reference or page identified in the social share, and derives a unique identifier for each reference or page identifier in the social share.

The selection module 120 can determine whether the data for the social share is represented on the page based on a comparison of the data for the social share with page data obtained from the page data 150 in the storage system 130. The page data for the page can have one or more identifiers associated with the page. The page data for the page can include an identifier of each content item included in the page, an identifier of a channel associated with the content item(s) included in the page, an identifier of a playlist associated with the content item(s) included in the page, an identifier of a user associated with the page, a canonical string identifier for the page, such as a canonical uniform resource locator (URL), etc. The selection module 120 will compare each identifier in the data for the social share to each identifier in the page data. If an identifier in the data for the social share is not included in the page data, the selection module 120 will determine that the identifier for the social share that is not included in the page data is not represented on the page. If each identifier in the data for the social share is included in the page data, the selection module 120 will determine that the data for the social share is represented on the page.

The selection module 120 can include a representation for at least a portion of the data for the social share that is not represented on the page by selecting a representation for an identifier that is in the data for the social share and that is not included in the page data. The selection module 120 can select the representation for an identifier using the representation data 160.

In one embodiment, upon selecting a representation to include on the page, the selection module 120 modifies the page to include the representation. In this embodiment, upon modifying the page, the selection module 120 can cause the modified page to be rendered as a user interface on the client/user device 105. In an alternate embodiment, upon selecting a representation to include on the page (e.g. a GUI document), the selection module 120 provides the representation and other information for the page to the client/user device 105. In this embodiment, the client/user device 105 can modify the page to include the representation and the other information for the page and can use the modified page to provide the GUI on the client/user device 105.

FIG. 2 illustrates a selection module 200, in accordance with one embodiment of the present disclosure. The selection module 200 may include an identifier determination sub-module 205, a representation selection sub-module 210, and a presentation modification sub-module 215. More or less components may be included in the channel subscribability module 200 without loss of generality.

The identifier determination sub-module 205 may receive a request for a page. The page can be a watch page associated with a media item or digital content, a page for a playlist with multiple media items, a page that loads and plays or causes a player to load and play a media item, a page for a channel that is associated with one or more media items, a page for a channel that is associated with a user, a social network page associated with a user, etc. For example, the page can be a watch page for a video. In another example, the page can be a social network page that is a personal webpage of a user for the user to post pictures, videos, music, and other media items to share. The request for the page can include an identifier for the page, such as a URL associated with the page. Based on the identifier included in the request for the page, the identifier determination sub-module 205 can obtain page data for the page from a data store, such as from requested page identifiers 255 in data store 250. The page data for the page can include an identifier of content included in the page, an identifier of a channel associated with the content included in the page, an identifier of a playlist associated with the content included in the page, an identifier of a user associated with the page, a canonical string identifier for the page, such as a canonical uniform resource locator (URL), etc. The identifier determination sub-module 205 can further obtain social share identifiers for the page from a data store, such as from social share identifiers 260. Social share identifiers 260 can include the social shares associated with the page and identifiers associated with each of the social shares. A social share can be a comment, a post, or any other content that is associated with the page. The identifiers associated with each of the social shares can include an identifier for each content item or reference directly or indirectly included in the social share. That is, a content item or a reference can be specifically included in the social share (e.g., a video mentioned in a comment on a page), or a content or a reference can be indirectly included in the social share when it is associated with content specifically mentioned in the social share (e.g., a playlist associated with a video mentioned in a comment on a page).

The identifier determination sub-module 205 can determine whether the identifiers associated with each social share for the requested page is represented on the page based on a comparison of the social share identifiers and the requested page identifiers for the requested page. The identifier determination sub-module 205 compares each identifier in the social share identifiers to each identifier in the requested page identifiers for the page. The identifier determination sub-module can generate an identifier list for each social store. In one embodiment, the identifier determination sub-module 205 generates the identifier list by copying each of the social share identifiers for the social share to the identifier list. In this embodiment, the identifier determination sub-module 205 compares each social share identifier for the social store to each of the requested page identifiers. If the identifier determination sub-module 205 determines that a social share identifier for the social store matches one of the requested page identifiers, the identifier determination sub-module 205 determines that the social share identifier is represented on the page and removes (or deletes) the social share identifier from the identifier list. If the identifier determination sub-module 205 determines that a social share identifier for the social store does not match any of the requested page identifiers, the identifier determination sub-module 205 determines that the social share identifier is not represented on the page and leaves the social share identifier in the identifier list.

In an alternate embodiment, the identifier determination sub-module 205 generates the identifier list by creating an empty file. In this embodiment, the identifier determination sub-module 205 compares each social share identifier for the social store to each of the requested page identifiers. If the identifier determination sub-module 205 determines that a social share identifier for the social store matches one of the requested page identifiers, the identifier determination sub-module 205 determines that the social share identifier is represented on the page and does not update the identifier list to include the social share identifier. If the identifier determination sub-module 205 determines that a social share identifier for the social store does not match any of the requested page identifiers, the identifier determination sub-module 205 determines that the social share identifier is not represented on the page and updates the identifier list to include the social share identifier.

The identifier determination sub-module 205 can perform a comparison for each of the social share identifiers for the page and update the identifier list accordingly. The identifier determination sub-module 205 can store the identifier list in a data store, such as in identifier lists 270 in data store 250.

Based on the above information, the representation selection sub-module 210 can select an identifier from the identifier list for the social share. In one embodiment, the representation selection sub-module 210 randomly selects the identifier from the identifier list. In an alternate embodiment, the representation selection sub-module 210 selects the unique string identifier from the identifier list for the social share using machine learning techniques. The machine learning techniques may be based on the user requesting the page and a course of action that will be taken by a user. In another alternate embodiment, the representation selection sub-module 210 selects an identifier from the identifier list based on a how the identifier was included in the social share. Other embodiments for selecting an identifier from the identifier list can be used without departing from the scope of the present disclosure.

Based on the above information, the presentation modification sub-module 215 can modify the presentation of the social share associated with the requested page to include a graphic representation for the selected identifier or identifiers. The presentation modification sub-module 215 can modify the presentation of the social share on the page to include a graphic representation for the reference in the social share by obtaining a representation for the reference in the social share from a data store, such as representations 265 in data store 250 and including the representation for the reference in a presentation provided to a client or user device (not shown). The graphic representation for the reference can be a thumbnail, a graphic or other representation associated with the reference. The presentation modification sub-module 215 can provide the modified presentation of the social share to cause a client or user device to present the modified presentation of the social share on the page.

Figure 3A:
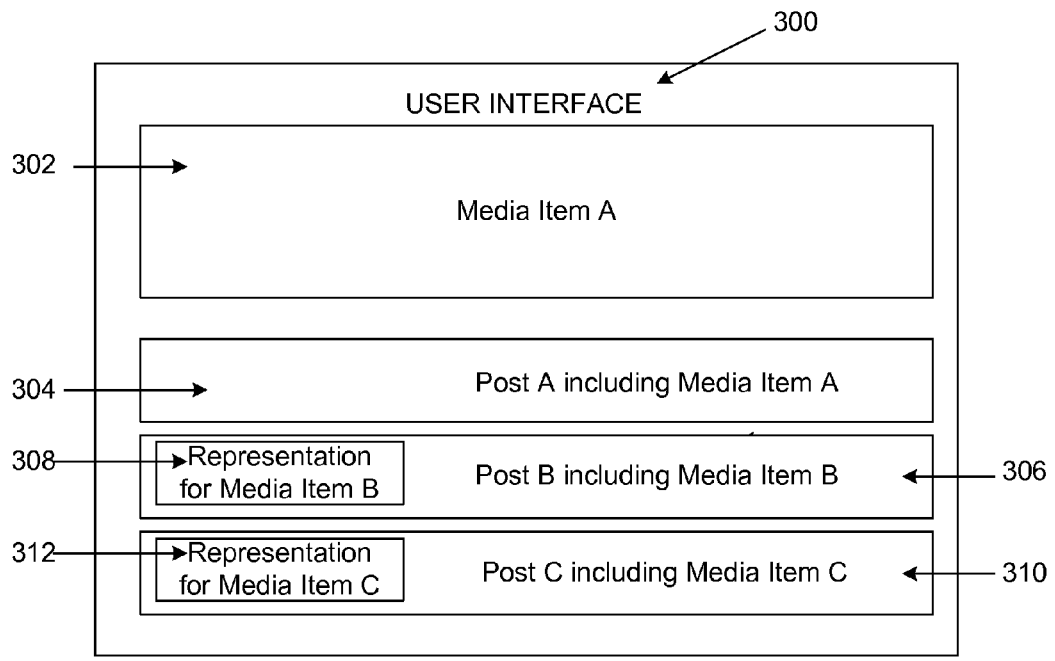
FIG. 3A illustrates a user interface, in accordance with one embodiment of the present disclosure.

FIG. 3A is an example user interface 300 in accordance with one embodiment of the present disclosure. For example, the user can be presented with the user interface 300 in response to a user requesting a page. The user interface 300 can be provided to a user via a web browser, an application (e.g., a mobile app), embedded in a third party web page, etc.

The user interface 300 includes media item 302, a post A 304, a post B 306, and a post C 310. The media item 302 can be a video, an audio file, a blog, etc. Post A 304, post B 306, and post C 310 can be social shares that are associated with the page presented in user interface 300. Post A 304 is a social share that includes a reference to media item A. Media item A 302 is represented on the page of user interface 300. Therefore, although media item A is also mentioned in post A 304, post A 304 will not include a representation, such as a thumbnail, for media item A 302. Post B 306 is a social share that includes a media item B. However, media item B is not represented on the page of user interface 300 because an identifier for media item B is not associated with the page. Therefore, post B 306 includes a representation 308 for media item B. Post C 310 is a social share that includes a media item C. However, media item C is not represented on the page represented by user interface 300 because an identifier for media item C is not associated with the page. Therefore, post C 310 includes a representation 312 for media item C.

Figure 3B:
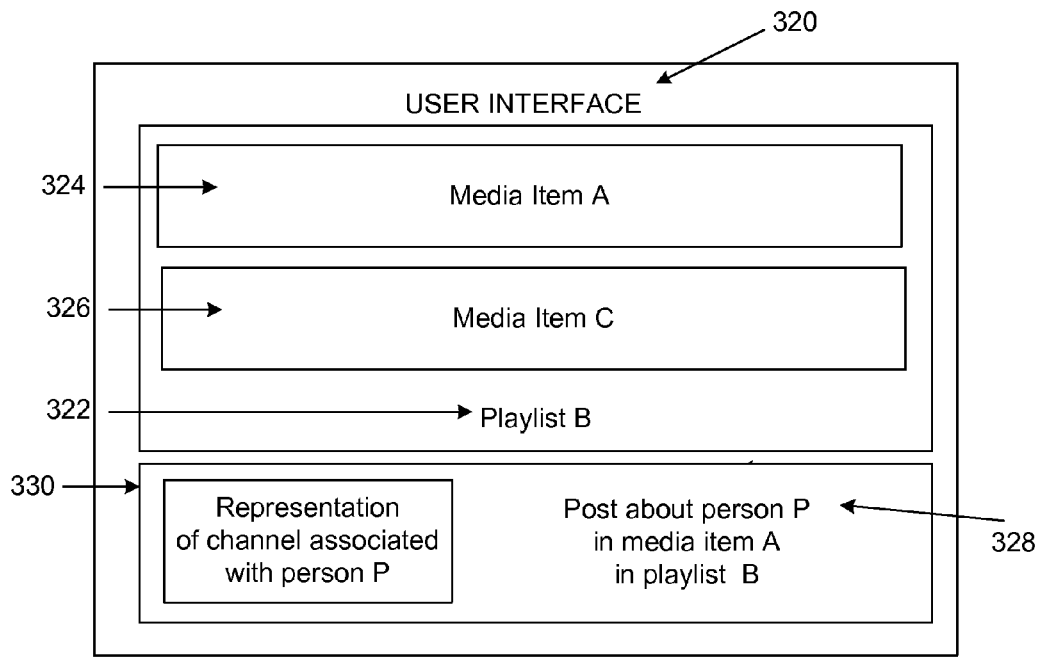
FIG. 3B illustrates a user interface, in accordance with another embodiment of the present disclosure.

FIG. 3B is an example user interface 320 in accordance with one embodiment of the present disclosure. For example, the user can be presented with the user interface 320 in response to a user requesting a page. The user interface 320 can be provided to a user via a web browser, an application, embedded in a third party web page, etc.

A user creates a social share 328 by commenting about a person in a media item A 324 in a playlist B 322. The playlist B 322 includes the media item A 324 and a media item C 326. Three unique identifiers will be included in an identifier list for the social share 328: a unique identifier for media item A 324, a unique identifier for playlist B 322, and a unique identifier for a channel associated with the person in media item A 324.

The user will be presented with user interface 320 in response to a user request for playlist B 322. The page data for the user interface 320 will include a unique identifier for media item A 324 and a unique identifier for playlist B 322. Therefore, these unique identifiers will be removed from the identifier list for the social post 328 associated with the page presented in user interface 320. Therefore, the identifier list for the social share 328 on the watch page for playlist B will include the unique identifier for the channel associated with the person in media item A. The unique identifier for the channel associated with the person in media item A 324 will be selected from the identifier list. When the social share 328 is presented on the watch page for playlist B 322, the social share 328 is modified to include a representation 330 for the channel associated with the person in media item A.

Figure 3C:
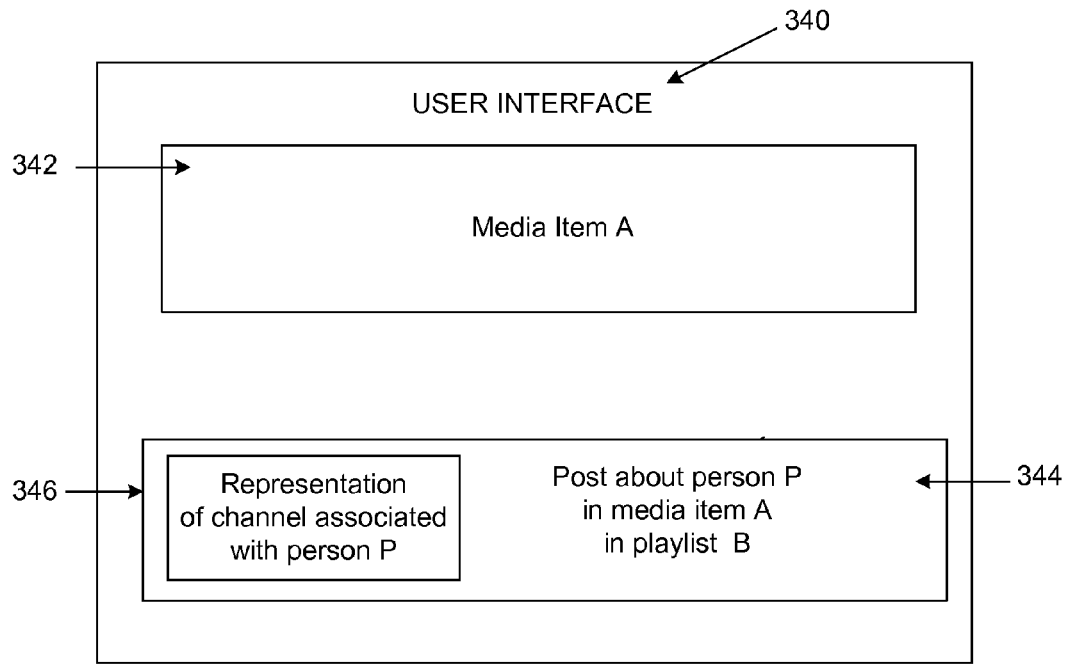
FIG. 3C illustrates a user interface, in accordance with another embodiment of the present disclosure.

FIG. 3C is an example user interface 340 in accordance with one embodiment of the present disclosure. For example, the user can be presented with the user interface 340 in response to a user requesting a page. The user interface 340 can be provided to a user via a web page, an application, embedded in a third party web page, etc.

A social share 344 can be associated with the user interface 340 because a user posted a social share that references media item A. Three unique identifiers are included in an identifier list for the social share 344: a unique identifier for media item A 342, a unique identifier for a playlist B (not shown), and a unique identifier for a channel associated with person P in media item A 342.

The user will be presented with user interface 340 in response to a user request for the watch page for media item A 342. When the watch page for video A is presented as user interface 340, a unique identifier represented on the page is a unique identifier for media item A 342, which will be removed from the identifier list for the social share 344 associated with the page. Therefore, the identifier list for the social share 344 includes the identifier for playlist B and the unique identifier for the channel associated with the person P in media item A. When the social share 344 is included on the watch page for media item A, the social share 344 is modified to include a representation of channel associated with person P 346 because the person in video A was mentioned in the text of the social share. In an alternate embodiment, when the social share 344 is included on the watch page for media item A, the social share 344 is modified to include a representation for playlist B. In another alternate embodiment, when the social share 344 is included on the watch page for media item A, the social share 344 is modified to include both the representation for playlist B and the channel associated with person P in media item A.

Figure 3D:
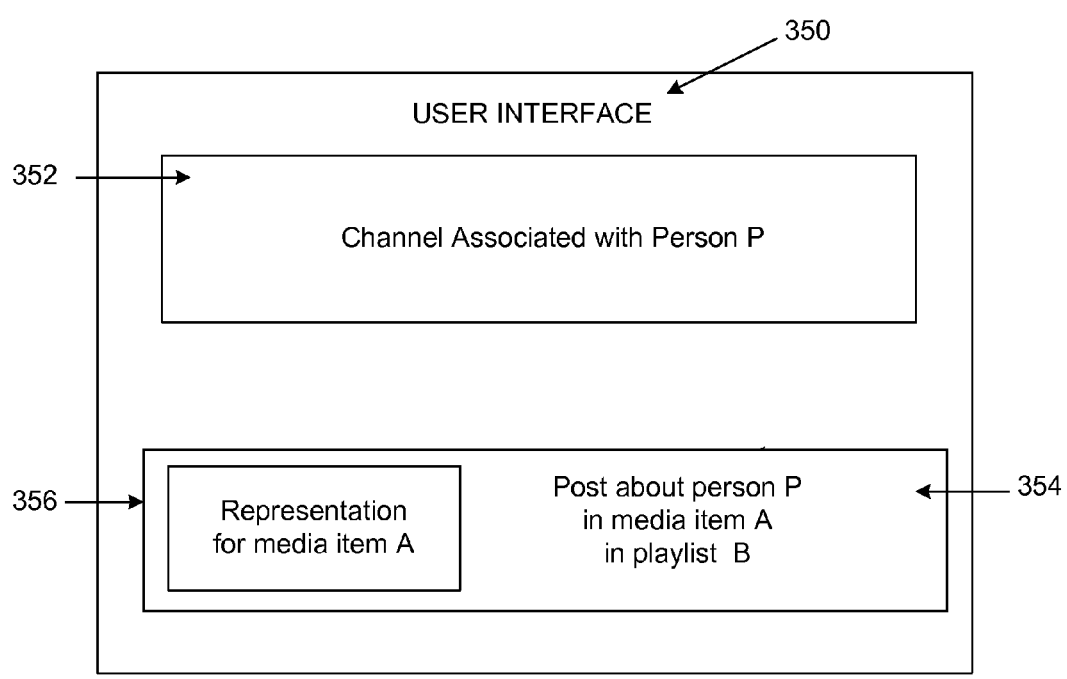
FIG. 3D illustrates a user interface, in accordance with another embodiment of the present disclosure.

FIG. 3D is an example user interface 350 in accordance with one embodiment of the present disclosure. For example, the user can be presented with the user interface 350 in response to a user requesting a page. The user interface 350 can be provided to a user via a web browser, an application, embedded in a third party web page, etc.

A social share 354 can be associated with the user interface 350 because a user posted a social share that references person P. Three unique identifiers are included in an identifier list for the social share 354: a unique identifier for media item A, a unique identifier for a playlist B, and a unique identifier for a channel 352 associated with person P in media item A.

The user will be presented with user interface 350 in response to a user request for the channel associated with the person P 352. When the page for the channel associated with the person P 352 is presented as user interface 350, the unique identifier represented on the page will be the unique string identifier of the channel associated with the person P 352, which will be removed from the identifier list for the social share 354. Therefore, the identifier list for the social share 354 on the page for the channel associated with the person P 352 will include the unique identifier for media item A and the unique identifier for playlist B. When the social share 354 is presented on the page for the channel associated with the person P, the social share 354 is modified to include a representation 356 for media item A. In another embodiment, when the social share 354 is presented on the page for the channel associated with the person P, the social share 354 is modified to include a representation for playlist B. In an alternate embodiment, when the social share 354 is presented on the page for the channel associated with the person P, the social share 354 is modified to include both the representation for video A and the representation for playlist B.

Figure 3E:
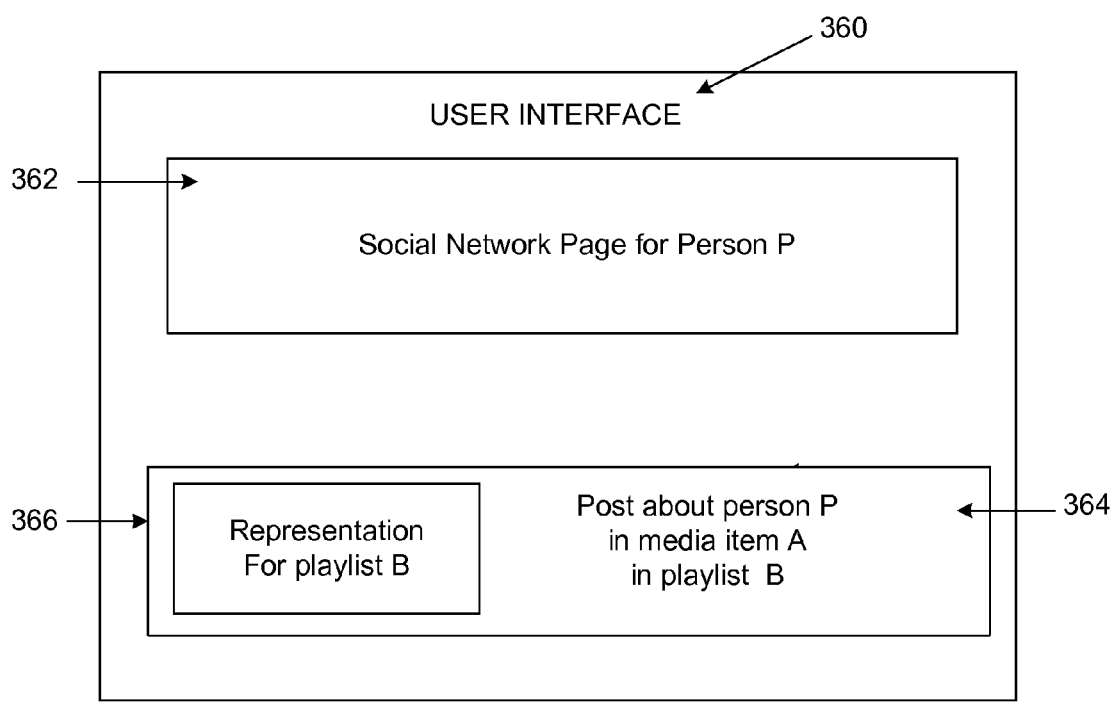
FIG. 3E illustrates a user interface, in accordance with another embodiment of the present disclosure.

FIG. 3E is an example user interface 360 in accordance with one embodiment of the present disclosure. For example, the user can be presented with the user interface 360 in response to a user requesting a page. The user interface 360 can be provided to a user via a web browser, an application, embedded in a third party web page, etc.

A social share 364 can be associated with the page presented as the user interface 360 because a user posted a social share that references person P. Three unique identifiers are included in an identifier list for the social share 364: a unique identifier for media item A, a unique identifier for a playlist B, and a unique identifier for a channel associated with person P in media item A.

The user will be presented with user interface 350 in response to a user request for the social network page for person P 362. When a user loads a social network page for the person in video A, the unique string identifier represented on the page will be the unique string identifier associated with the social network page associated with person in video A, which does not exist in the identifier list for the social share 364 associated with the page. Therefore, the identifier list for the social share 364 on the social network page for the person P will include the unique identifier for media item A, the unique identifier for playlist B, and the unique identifier for the channel associated with the person P. When the social share 364 is presented on the social network page for the person P, the social share 364 can be modified to include a representation 366 for playlist B. For example, the social share 364 is modified to include the representation 366 for playlist B because a machine learning algorithm has learned that the user requesting the page spends the most time on site when watching a playlist. In another embodiment, when the social share 364 is presented on the social network page for the person P, the social share 364 can be modified to include a representation for the media item A. In an alternate embodiment, when the social share 364 is presented on the social network page for the person P, the social share 364 can be modified to include a representation for the channel associated with the person P.

Figure 4:
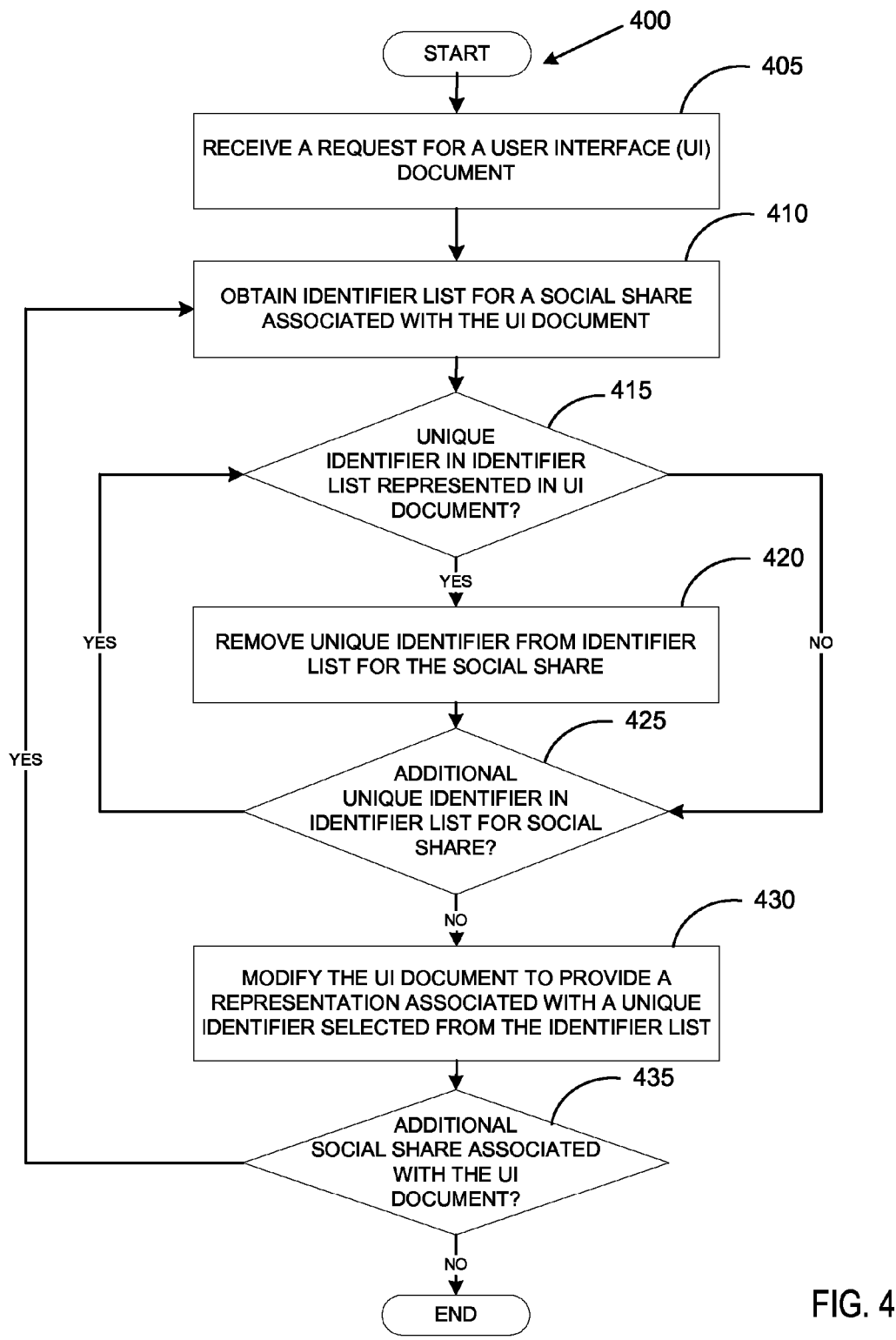
FIG. 4 is a flow diagram illustrating one embodiment for a method of dynamically selecting content from social shares to display in a user interface, in accordance with one embodiment of the present disclosure.

FIG. 4 is a flow diagram illustrating an embodiment for a method 400 of dynamically selecting content from social shares to display in a user interface. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the content server 110 of FIG. 1).

At block 405, processing logic receives a request for a UI document (page). In one embodiment, the UI document is a watch page associated with a media item or digital content that presents the media item or digital content for consumption by the user. For example, the watch page is a webpage or mobile application document to present a playlist with multiple media items to a user, to load and play or to cause a player to load and play a media item requested by the user, to present a channel that is associated with one or more media items, etc. In an alternate embodiment, the page is a social network page associated with the user or another user. For example, the social network page can be a personal webpage of a friend of the user where the friend posts pictures, videos, music, and other media items to share.

The UI document (page) can have one or more unique string identifiers associated with it. The unique string identifier can be an identifier of content included in the page, an identifier of a channel associated with the content included in the page, an identifier of a playlist associated with the content included in the page, an identifier of a user associated with the page, a canonical string identifier for the page, such as a canonical uniform resource locator (URL), etc. A canonical string identifier for the page is a base identifier or the minimum identifier that can be used to access the page. Additional strings can be added to the canonical identifier and still identify the page, but no shorter string can be used to identify the page. For example, a canonical URL for a page is: http://www.website.com/watch?PAGE_ID. A non-canonical URL (that includes the canonical URL) for the page can be used to access the page, such as http://www.website.com/watch?PAGE_ID/featureABC. In another example, a canonical identifier for a page is PAGE_ID and a non-canonical identifier for the page can be PAGE_ID&FEATURE_ID. Multiple unique string identifiers can be associated with a watch page, such as an identifier for each media item loaded and/or played from the page, an identifier for a playlist that includes the media item, an identifier for a channel associated with the media item, etc. For example, a watch page that loads and plays a video has three unique string identifiers associated with it: 1) an identifier for the video loaded and played by the watch page (e.g., a video ID), 2) an identifier for a playlist associated with the identifier for the video (e.g., provides an identifier for the instance of the video in the playlist), and 3) an identifier for a channel that uploaded the video. In another example, a page for a playlist has a unique string identifier for each media item in the playlist (e.g., video ID for each video in the playlist) and an identifier for the playlist (e.g., playlist ID).

At block 410, processing logic obtains an identifier list for a social share associated with the UI document (page). A social share can be a comment, a post, or any other context that is associated with the UI document. In one embodiment, the social share is directly associated with the page when it is posted to the page. For example, a user posts a comment directly to a watch page for a video A, such as "if you really like this video, check this video out: http://www.website.com/videoB." In another example, a user posts a comment directly to a social network page associated with the user, such as "Going on a trip! http://www.website.com/vacation." In an alternate embodiment, the social share is indirectly associated with the page when the social share includes a string identifier associated with the page, such as an identifier of a media item represented by the page. For example, a user posts a comment to a social network page saying "Check out my new favorite video: http://www.website.com/videoC!" The social share from the social network site will be associated with the page for video C and will be included in the watch page for video C. When a social share is posted on a page, the social share can be tagged with unique string identifiers included, directly or indirectly, in the social share. The social share can be stored in a database or other searchable repository and associated with each unique string identifier included in the social share. When a page is requested, the database or searchable repository can be queried using the unique string identifier for the page, and the social share is included in the results of the query when the unique string identifier for the page is associated with a unique string identifier included in the social share.

In one embodiment, the identifier list for the social share associated with the UI document (page) includes unique string identifiers associated with the social share. In an alternate embodiment, the identifier list for the social share associated with the page includes all string identifiers associated with the social share and updates the identifier list to only include the unique string identifiers from all of the string identifiers (e.g., by removing the non-unique string identifiers from the identifier list).

The identifier list can include a unique string identifier for the page on which the social share is made and for each page identifier included in the content of the social share. For example, a social share is posted on a social network site www.socialnetworksite.com/userID=JoeSmith and the social share is a comment that states: "My new favorite videos: http://www.website.com/video A and http://www.website.com/video B!" In this example, the identifier list includes 3 unique string identifiers associated with the social share: 1) a unique string identifier for the social network site, such as the user identifier of Joe Smith 2) a unique string identifier for video A, such as the video A's identifier, and 3) a unique string identifier for video B, such as video B's identifier. In on embodiment, a social share is a comment on made on a playlist page. In this embodiment, the identifier list for the social share will include a unique string identifier (e.g., URL) for the playlist page and a unique string identifier (e.g., URL) for each of the media items associated with the playlist page.

In one embodiment, processing logic obtains the identifier list for the social share associated with the UI document by submitting a query including a unique identifier associated with the page to a database. In an alternate embodiment, processing logic obtains the identifier list for the social share associated with the page by searching a memory or other store for the unique identifier associated with the page. In another alternate embodiment, processing logic obtains the social share associated with the page by receiving the identifier list associated with the social share from a content hosting service, a social network site, a computing system, a content server, etc.

In one embodiment, processing logic obtains the identifier list for the social share by obtaining metadata associated with each page identifier in the social share and determining one or more unique string identifiers for each page to include in the identifier list based on the metadata associated with each page. For example, a social share is posted on a social network site www.socialnetworksite.com/userID=JoeSmith and the social share is a comment that states: "My new favorite videos: http://www.website.com/video A and http://www.website.com/video B!" In this example, processing logic obtains the metadata for the page identified by www.socialnetworksite.com/userID=JoeSmith, the metadata for the page identified by http://www.website.com/video A, and the metadata for the page identified by and http://www.website.com/video B, and determines a unique string identifier for each of the pages based on the metadata for each page.

The metadata associated with a page identifier in the social share can include a string identifier for a title associated with the page (e.g., title of the video, title of the blog, etc.), a graphical representation associated with the page (e.g., a thumbnail of a video represented by the page, etc.), and one or more string identifiers for the page identified by the page identifier (e.g., a canonical URL for the page, non-canonical URLs for the page, a unique string identifier associated with the page, etc.). In some embodiments, the metadata associated with the page identifier includes a media item identifier associated with the page, a channel identifier associated with the page, and/or a playlist identifier associated with the page identified by the page identifier. Processing logic can obtain the string identifiers from the metadata and determine which of the string identifiers uniquely represent the page. If the metadata does not include the unique string identifier associated with the page, processing logic can derive the unique string identifier associated with the page by obtaining a page identifier for the page (e.g., from metadata) and determining the base unique identifier that can be used to identify the page. In one embodiment, processing logic determines the base unique identifier by updating the string identifier by removing portions of the string identifier and accessing the page associated with the updated string identifier. If the updated string identifier accesses the same page, processing logic continues removing portions of the string identifier until the page is not accessible by the updated string identifier. Upon not being able to access the page with the updated string identifier, processing logic can revert to the previous string identifier that worked and determine that is the base unique identifier for the page. For example, if the metadata can include a page identifier http://www.website.com/watch?v=9bZkp7q19f0\this_is_extra, processing logic removes the "this_is_extra" portion of the URL and accesses the page. In this example, the page will be accessible and processing logic determines that http://www.website.com/watch?v=9bZkp7q19f0 is the canonical URL.

In one embodiment, processing logic obtains the identifier list for a social share associated with the UI document by providing a request for the identifier list for the social share to a server associated with the site to which the social share is provided. For example, a social share includes an identifier for a page for media item A by including a URL for media item A in the social share. In this example, if the social share is submitted to a social network site, processing logic obtains the metadata by requesting the identifier list from the social network site. In this example, the social network site obtains the page identified by the URL for media item A, pulls down the metadata associated with the page, and provides the identifier list to the processing logic. In an alternate embodiment, the identifier list for a social share can be obtained by requesting the identifier list from a content server, from a data store, from a site associated with the social share, etc.

At block 415, processing logic determines whether a unique string identifier associated with the social share is represented in the UI document. Processing logic can determine whether a unique string identifier associated in the identifier list is represented in the UI document by obtaining the unique string identifier from the identifier list and comparing the unique string identifier to each of the unique string identifiers associated with the UI document, and determining whether the unique string identifier in the identifier list is represented in the UI document based on the comparison. Processing logic can determine that the unique string identifier in the identifier list is represented in the UI document when the comparison finds a match between the unique string identifier in the identifier list and at least one of the unique string identifiers associated with the UI document. Processing logic can determine that the unique string identifier in the identifier list is not represented in the UI document when the comparison does not find a match between the unique string identifier in the identifier list and any of the unique string identifiers associated with the UI document (page).

Processing logic can compare the unique string identifier in the identifier list to each of the unique string identifiers associated with the UI document to determine whether the unique string identifier in the identifier list matches any of the unique string identifiers associated with the UI document. For example, a unique string identifier in the identifier list is video ID "ABC" and unique string identifiers for the UI document are video ID "ABC", playlist ID "123", and channel ID "DEF." In this example, the unique string identifier in the identifier list will match the unique string identifier "ABC" for the UI document. In another example, a unique string identifier in the identifier list is video ID "XYZ" and unique string identifiers for the UI document are video ID "ABC", playlist ID "123", and channel ID "DEF." In this example, the unique string identifier in the identifier list will not match any of the unique string identifiers for the UI document.

Upon determining that the unique string identifier in the identifier list is not represented in the UI document, the method 400 proceeds to block 425 to determine if there is an additional unique string identifier in the identifier list. Upon determining that the unique string identifier in the identifier list is represented in the UI document, the method 400 proceeds to block 420.

At block 420, processing logic removes the unique string identifier from the identifier list associated with the social share. The identifier list can include all the unique string identifiers associated with the social share that are not represented in the UI document. Therefore, the identifier list may not include the unique string identifiers associated with the social share that are represented in the UI document (e.g., unique string identifier for a social share that is about the same unique string identifier as the watch page). For example, if a user on a social network site made a comment about video A, the comment is also included on the watch page for video A on a content hosting site. In this example, because the comment for video A is included on the watch page for video A, a unique string identifier for video A is removed from the identifier list because a graphical representation for video A is not necessary because the watch page already includes a graphical representation for video A (e.g., the video itself).

At block 425, processing logic determines whether an additional unique string identifier is in the identifier list. Processing logic can determine whether an additional unique string identifier is in the identifier list share by accessing the identifier list. For example, a social share includes a unique string identifier for video A, a unique identifier for video B, and a unique identifier for video C. In this example, if a determination of whether the unique string identifier for video A, video B, and video C are represented in the UI document has not been made for each of the unique string identifiers for video A, video B, and video C, then processing logic will determine that an additional unique string identifier is in the identifier list. If an additional unique string identifier is in the identifier list for the social share, the method 400 returns to block 415 to determine if the additional unique string identifier in the identifier list associated with the social share is represented in the UI document. If an additional unique string identifier is not in the identifier list for the social share, the method 400 proceeds to block 430.

At block 430, processing logic includes a representation associated with a unique string identifier selected from the identifier list for the social share. For example, if the identifier list includes a unique string identifier associated with video B, processing logic will include a representation in the social share for video B. The representation can be a graphical representation, such as a thumbnail or other visual representation associated with the unique string identifier.

In some embodiments, processing logic can select a unique string identifier from the identifier list for the social share. In one embodiment, processing logic randomly selects the unique string identifier from the identifier list. For example, if the identifier list includes a unique string identifier for video A, video B, and video C, processing logic randomly selects one of the unique string identifiers. In an alternate embodiment, processing logic selects the unique string identifier from the identifier list for the social share using machine learning techniques. The machine learning techniques may be based on the user requesting the UI document (page). The machine learning algorithm can provide information about the representation to include that will cause the user requesting the page to spend the most time on a site, such as a website or mobile application site that is associated with the page requested by the user. For example, if the machine learning algorithm has learned that the user requesting the page spends the most time on site when watching videos or playlists, then the social share is modified to include a representation of video A or playlist B. In another example, if the machine learning algorithm has learned that the user requesting the page spends the most time on site when browsing a channel, then the social share is modified to include a representation of the channel associated with the person in video A, rather than the representation of video A or the representation for playlist B.

In another alternate embodiment, processing logic selects the unique identifier from the identifier list for the social share based on historical data associated with the user or other users. If there are multiple valid media items to choose from to display, processing logic can use historical data associated with the user to select a unique identifier for a media item that the user has not previously viewed over a unique identifier for a media item that the user has previously viewed. Processing logic can select the unique identifier based on historical data by using user cluster techniques to recognize that a media item that is specifically more optimal because the user is more likely to click on it. Processing logic can use user cluster techniques to recognize the media item based on an effect of the content of the media item or appearance of the media item thumbnail. In some embodiments, processing logic determines the effect based on a machine learning algorithm. For example, based on the user, the machine learning algorithm learns that because of the effect of the content or appearance of the media item, processing logic should select the set of media items the current user has watched recently, select a set of users who have also watched the same media items, pick the media item which a set of users have viewed most from a list of candidate media items, etc.

In yet another alternate embodiment, processing logic selects the unique identifier from the identifier list for the social share based on a ranking of the pages associated with the unique identifier. For example, if a watch page for a unique identifier A has a higher ranking (e.g., number of views, number of likes, etc.) than the watch page for a unique identifier B, processing logic selects the unique identifier A for the social share.

In an additional alternate embodiment, processing logic selects the unique string identifier from the identifier list for the social share that is directly included in the social share. For example, if a social post includes a URL for video A, then a representation for video A is included in the social share because video A is directly mentioned in the social share. In another example, if a watch page for a video A is includes a social share for video B and video B is associated with a playlist C, then a representation for video B is selected rather than a representation for playlist C because video B is directly mentioned in the social share, whereas playlist B is indirectly associated with the social share.

Other alternate embodiments for selecting the unique identifier from the identifier list can be used without departing from the scope of the present disclosure.

Figure 5:
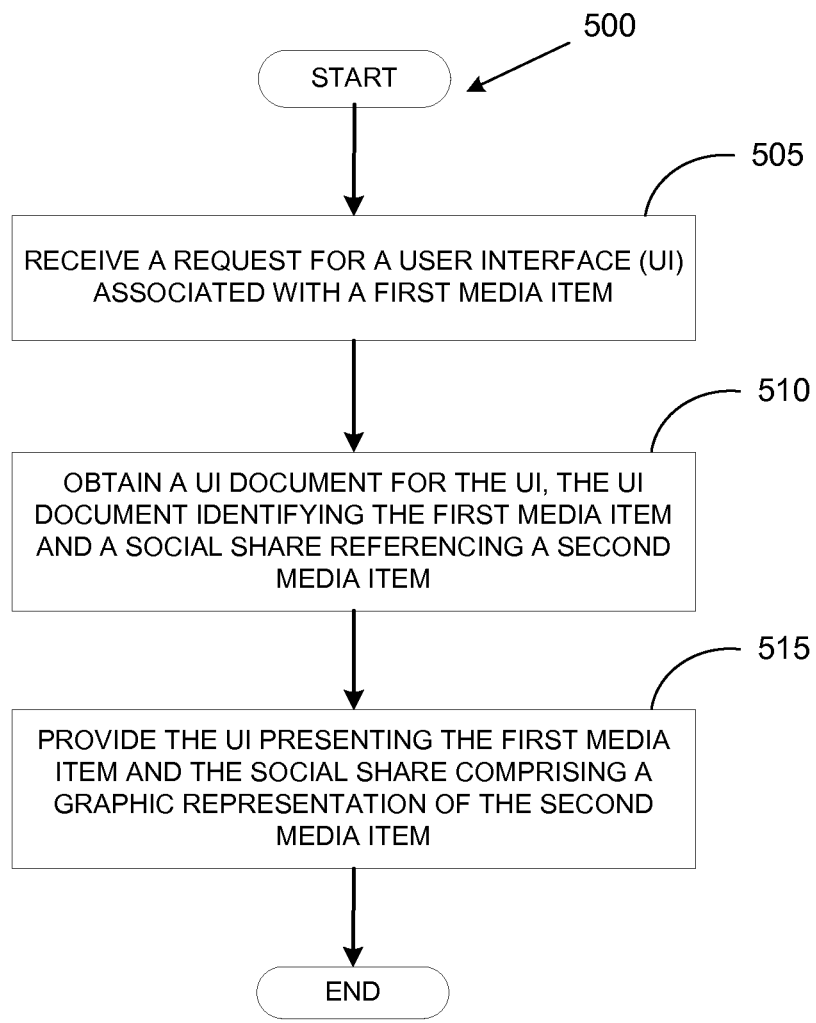
FIG. 5 is a flow diagram illustrating one embodiment for a method of displaying a social share with dynamically selected content in a user interface, in accordance with one embodiment of the present disclosure.

FIG. 5 is a flow diagram illustrating an embodiment for a method 500 of displaying a social share with dynamically selected content in a user interface. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a server (e.g., the content server 110 of FIG. 1).

At block 505, processing logic receives a request for a user interface associated with a first media item. The request for the user interface associated with the first media item can include an identifier for the user interface, such as a URL. The user interface can be associated with a GUI document (e.g., a web page or a mobile app document), such as a watch page associated with a media item or digital content that presents the media item or digital content for consumption by the user, a social network page associated with the user or another user, etc.

At block 510, processing logic obtains a GUI document for the user interface. One or more unique string identifiers associated with the GUI document can represent the GUI document, including a unique string identifier for the first media item. For example, the unique string identifiers can include as an identifier of content included in the GUI document, an identifier of a channel associated with the content included in the GUI document, an identifier of a playlist associated with the content included in the GUI document, an identifier of a user associated with the GUI document, a canonical string identifier for the GUI document, such as a canonical uniform resource locator (URL), etc. One or more social shares can also be associated with the GUI document (e.g., a web page or a mobile app document), such as comments, posts, etc. A social share can include a reference to other social shares, media items, or content. The social share can be associated with a unique string identifier for each reference. The social share can include a reference to a second media item that is different than the first media item. For example, the UI request is for video A and the social share includes a reference to video B.

At block 515, processing logic provides the UI presenting the first media item and the social share. The social share will include a graphic representation (e.g., thumbnail, etc.) of the second media item. Processing logic can provide the UI presenting the first media item and the social share by modifying the presentation of the social share in the UI to include a graphic representation for a reference in the social share. Processing logic can modify the presentation of the social share in the UI to include a graphic representation for the reference in the social share by receiving a representation for the reference in the social share and including the representation for the reference in the presentation for the social share in the UI. The graphic representation for the reference can be a thumbnail, a graphic or other representation associated with the reference. For example, a UI document for video A includes a social share with a link for video B and the representation received for video B is a thumbnail. In this example, processing logic will provide the UI to present video A and the social share including the link for video B and the thumbnail for video B.

Processing logic can provide the UI presenting the first media item and the social share including the graphic representation of the second media item by causing the UI to be presented on a user device of a user requesting the page.

In one embodiment, if processing logic receives a request for a user interface associated with the second media item, processing logic will obtain a UI document for the UI associated with the second media item, such as a webpage or mobile page document associated with the second media item. For example, processing logic will obtain a watch page for the second media item. In this embodiment, processing logic obtains the social share associated with the second media item, which will include the social share associated with the first media item because the social share included a reference to the second media item. For example, if a social share associated with video A includes a reference to video B, the social share will be included on a watch page for video B. In this embodiment, if the social share includes a reference to another media item, such as the first media item or another media item, processing logic provides the UI associated with the second media item by modifying the presentation of the social share in the UI to include a graphic representation for the reference to the other media item. For example, if the social share includes a reference to video A and video B, and the UI requested is a watch page for video B, the provided UI will present video B and the social share including a graphic representation for video A. Processing logic can modify the presentation of the social share in the UI to include a graphic representation for the reference in the social share by receiving a representation for the reference in the social share and including the representation for the reference in the presentation for the social share in the UI. The graphic representation for the reference can be a thumbnail, a graphic or other representation associated with the reference.

Figure 6:
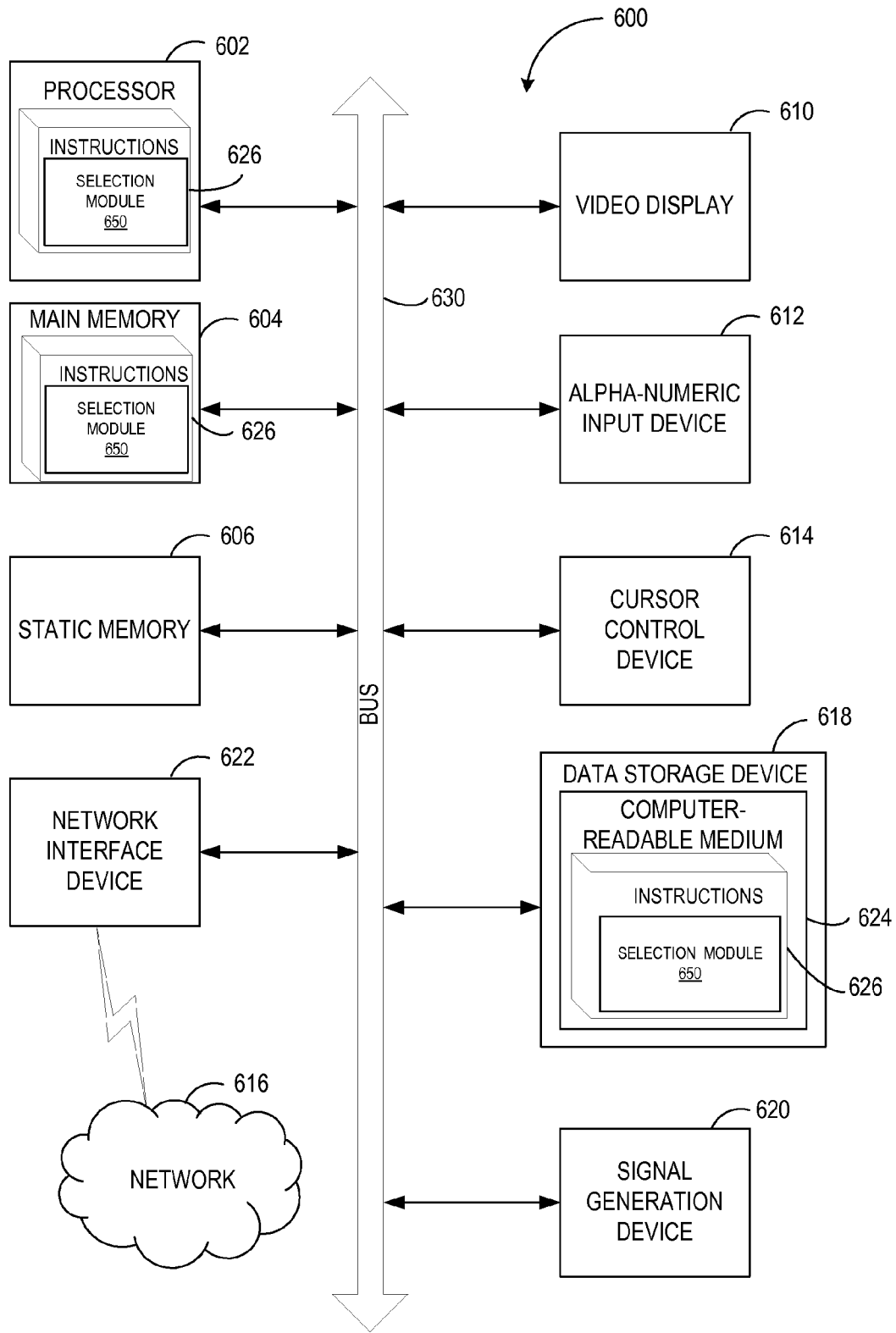
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 616 via the network interface device 622.

In one embodiment, the instructions 626 include instructions for a selection module 650, which may correspond to a selection module 120 of FIG. 1, and/or a software library containing methods that dynamically selects content from social shares to display in a user interface. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying", "presenting," "receiving," "modifying", "subscribing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving, by a processing device, a request for a user interface (UI) document comprising a first set of media items, wherein a set of identifiers is associated with the UI document, the set of identifiers comprising a page identifier for the UI document and one or more identifiers of the first set of media items;

obtaining, by the processing device, an identifier list for a second set of media items in a social share included in the UI document;

comparing the set of identifiers for the UI document with the identifier list for the social share to determine one or more media items in the second set of media items that are represented on the UI document;

updating the identifier list by removing identifiers of the one or more determined media items that are represented on the UI document; and modifying the UI document to provide a representation associated with a first identifier from the updated identifier list for the second set of media items of the social share.

2. The method of claim 1, further comprising:

obtaining an additional identifier list for a third set of media items in an additional social share included in the UI document;

comparing the set of identifiers for the UI document with the additional identifier list to determine one or more additional media items in the third set of media items that are represented on the UI document;

updating the additional identifier list by removing additional identifiers of the one or more determined additional media items that are represented on the UI document; and modifying the UI document to comprise an additional representation associated with an additional identifier from the updated additional identifier list for the third set of media items of the additional social share.

3. The method of claim 1, wherein the identifier list for the second set of media items in the social share included in the UI document comprises a canonical uniform resource locator (URL) for each media item of the second set of media items identified in the social share.

4. The method of claim 1, wherein updating the identifier list in view of the set of identifiers comprises:

for each identifier in the identifier list for the social share:

determining whether an identifier is represented on the UI document in view of the comparing of the set of identifiers for the UI document with the identifier list for the social share, upon determining that the identifier is represented on the UI document in view of the comparing, removing the identifier from the identifier list, and upon determining that the identifier is not represented on the UI document in view of the comparing, keeping the identifier in the identifier list.

5. The method of claim 1, further comprising:
selecting the first identifier from the updated identifier list in view of a user associated with the request for the UI document.

6. The method of claim 1, wherein the social share is at least one of a post submitted on a social network site, a comment submitted on the social network site, a post submitted on a content hosting site, or a comment submitted on the content hosting site.

7. A method comprising:
receiving, by a processing device, a request for a user interface (UI) associated with a first set of media items;
obtaining a UI document for the UI associated with the first set of media items, the UI document comprising the first set of media items and a social share referencing a second media item;
comparing the second media item with the first set of media items to determine whether the second media item is represented on the UI document; and
providing the UI presenting the first set of media items and the social share comprising a graphic representation of the second media item in response to a determination that the second media item is not represented on the UI document.

8. The method of claim 7, wherein the social share further references a third media item, wherein the first set of media items further comprises the third media item, and the method further comprising:
receiving a second request for a second UI associated with the second media item;
obtaining a second UI document for the second UI, the second UI document comprising the second media item and the social share referencing the third media item and the second media item; and
providing the second UI presenting the second media item and the social share comprising a second graphic representation of the third media item.

9. A non-transitory computer readable storage medium having instructions that, when executed by a processing device, cause the processing device to perform operations comprising:
receiving a request for a user interface (UI) document comprising a first set of media items, wherein a set of identifiers is associated with the UI document, the set of identifiers comprising a page identifier for the UI document and one or more identifiers of the first set of media items;
obtaining an identifier list for a second set of media items in a social share included in the UI document;
comparing the set of identifiers for the UI document with the identifier list for the social share to determine one or more media items in the second set of media items that are represented on the UI document;
updating the identifier list by removing identifiers of the one or more determined media items that are represented on the UI document; and
modifying the UI document to provide a representation associated with a first identifier from the updated identifier list for the second set of media items of the social share.

10. The non-transitory computer readable storage medium of claim 9, wherein the instructions, when executed by the processing device, cause the processing device to perform further operations comprising:

obtaining an additional identifier list for a third set of media items in an additional social share included in the UI document;
comparing the set of identifiers for the UI document with the additional identifier list to determine one or more additional media items in the third set of media items that are represented on the UI document;
updating the additional identifier list by removing additional identifiers of the one or more determined additional media items that are represented on the UI document; and
modifying the UI document to comprise an additional representation associated with an additional identifier from the updated additional identifier list for the third set of media items of the additional social share.

11. The non-transitory computer readable storage medium of claim 9, wherein the identifier list for the second set of media items in of the social share included in the UI document comprises a canonical uniform resource locator (URL) for each media item of the second set of media items identified in the social share.

12. The non-transitory computer readable storage medium of claim 9, wherein to update the identifier list in view of the set of identifiers, the operations further comprise:
for each identifier in the identifier list for the social share:
determining whether an identifier is represented on the UI document in view of the comparing of the set of identifiers for the UI document with the identifier list for the social share,
upon determining that the identifier is represented on the UI document in view of the comparing, removing the identifier from the identifier list, and
upon determining that the identifier is not represented on the UI document in view of the comparing, keeping the identifier in the identifier list.

13. The non-transitory computer readable storage medium of claim 9, wherein the instructions, when executed by the processing device, cause the processing device to perform further operations comprising:
selecting the first identifier from the updated identifier list in view of a user associated with the request for the UI document.

14. The non-transitory computer readable storage medium of claim 9, wherein the social share is at least one of a post submitted on a social network site, a comment submitted on the social network site, a post submitted on a content hosting site, or a comment submitted on the content hosting site.

15. A non-transitory computer readable storage medium having instructions that, when executed by a processing device, cause the processing device to perform operations comprising:
receiving a request for a user interface (UI) associated with a first set of media items;
obtaining a UI document for the UI associated with the first set of media items, the UI document comprising the first set of media items and a social share referencing a second media item;
comparing the second media item with the first set of media items to determine whether the second media item is represented on the UI document; and
providing the UI presenting the first set of media items and the social share comprising a graphic representation of the second media item in response to a determination that the second media item is not represented on the UI document.

16. A computing device comprising:
a memory; and a processing device coupled to the memory, wherein the processing device is to:
  receive a request for a user interface (UI) document comprising a first set of media items, wherein a set of identifiers is associated with the UI document, the set of identifiers comprising a page identifier for the UI document and one or more identifiers of the first set of media items;
  obtain an identifier list for a second set of media items in a social share included in the UI document;
  compare the set of identifiers for the UI document with the identifier list for the social share to determine one or more media items in the second set of media items that are represented on the UI document;
  update the identifier list by removing identifiers of the one or more determined media items that are represented on the UI document; and
  modify the UI document to provide a representation associated with a first identifier from the updated identifier list for the second set of media items of the social share.

17. The computing device of claim 16, wherein processing device is further to:
  obtain an additional identifier list for a third set of media items in an additional social share included in the UI document;
  compare the set of identifiers for the UI document with the additional identifier list to determine one or more additional media items in the third set of media items that are represented on the UI document;
  update the additional identifier list by removing additional identifiers of the one or more determined additional media items that are represented on the UI document; and
  modify the UI document to comprise an additional representation associated with an additional identifier from the updated additional identifier list for the third set of media items of the additional social share.

18. The computing device of claim 16, wherein to update the identifier list in view of the set of identifiers, the processing device is to:
  for each identifier in the identifier list for the social share:
    determine whether an identifier is represented on the UI document in view of comparing the set of identifiers for the UI document with the identifier list for the social share,
    upon determining that the identifier is represented on the UI document in view of the comparing, remove the identifier from the identifier list, and
    upon determining that the identifier is not represented on the UI document in view of the comparing, keep the identifier in the identifier list.

19. The computing device of claim 16, wherein the processing device is further to:
  select the first identifier from the updated identifier list in view of a user associated with the request for the UI document.

20. The method of claim 16, wherein the social share is at least one of a post submitted on a social network site, a comment submitted on the social network site, a post submitted on a content hosting site, or a comment submitted on the content hosting site.

* * * * *